US011273753B2

(12) United States Patent
Kubitza et al.

(10) Patent No.: US 11,273,753 B2
(45) Date of Patent: Mar. 15, 2022

(54) METHOD FOR ACTUATING AT LEAST ONE MAIN HEADLAMP OF A LIGHTING UNIT OF A VEHICLE, LIGHTING UNIT, COMPUTER PROGRAM PRODUCT AND MACHINE-READABLE MEDIUM (71) Applicant: Hella GmbH & Co. KGaA, Lippstadt (DE)

(72) Inventors: Boris Kubitza, Möhnesee-Körbecke (DE); Udo Venker, Güterloh (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/642,429

(22) PCT Filed: Aug. 23, 2018

(86) PCT No.: PCT/EP2018/072736
§ 371 (c)(1),
(2) Date: Feb. 27, 2020

(87) PCT Pub. No.: WO2019/042853
PCT Pub. Date: Mar. 7, 2019

(65) Prior Publication Data
US 2020/0254922 A1 Aug. 13, 2020

(30) Foreign Application Priority Data
Aug. 29, 2017 (DE) ..................... 10 2017 119 759.1

(51) Int. Cl.
*B60Q 1/02* (2006.01)
*B60Q 1/14* (2006.01)
*B60Q 1/08* (2006.01)

(52) U.S. Cl.
CPC ............. *B60Q 1/1423* (2013.01); *B60Q 1/08* (2013.01); *B60Q 2300/054* (2013.01); *B60Q 2300/112* (2013.01)

(58) Field of Classification Search
CPC .. B60Q 1/1423; B60Q 1/08; B60Q 2300/054; B60Q 2300/112; B60Q 2300/23; B60Q 2300/322; B60Q 1/085; F21W 2102/20
See application file for complete search history.

(56) References Cited

U.S. PATENT DOCUMENTS

2001/0000448 A1   4/2001  Suzuki et al.
2014/0044312 A1*  2/2014  Ehlgen ................ G01N 21/538
                                                382/104

(Continued)

FOREIGN PATENT DOCUMENTS

DE         10221433 A1    3/2003
DE      102005026684 A1   1/2006

(Continued)

Primary Examiner — Minh D A
(74) Attorney, Agent, or Firm — Husch Blackwell LLP (57) ABSTRACT A procedure is provided for actuating at least one main headlamp of a vehicle. The vehicle includes a detection device, and a light control for the automatic actuation of the main headlamp. The main headlamp illuminates an outer area of the area ahead of the vehicle in a first light intensity, and a core area of the area ahead of the vehicle at least partially enclosed by the outer area with a higher second light intensity. The core area is adjusted by the light control in terms of dimension and/or position. In order to improve the visual perceptibility to a vehicle driver of the area ahead of the vehicle, the core area is adjusted in relation to the outer area, and the outer area is adjusted by the light control in such a way depending on the input signal of the light control in terms of dimension and/or position that the (Continued)

vehicle's road and peripheral surroundings) bordering the road in the area ahead of the vehicle are illuminated by the outer area.

14 Claims, 4 Drawing Sheets

(56) References Cited

U.S. PATENT DOCUMENTS

2017/0232882 A1* 8/2017 Mochizuki ............ F21S 41/176
362/516
2018/0339645 A1* 11/2018 Ekkizogloy ............. F21S 41/00

FOREIGN PATENT DOCUMENTS

| | | |
|---|---|---|
| DE | 102015115954 A1 | 3/2016 |
| EP | 1234717 A2 | 8/2002 |
| EP | 1621400 B1 | 5/2012 |
| FR | 2949400 A1 | 3/2011 |
| JP | 2002234382 A | 8/2002 |
| JP | 2016068793 A | 5/2016 |
| WO | 2016/167250 A1 | 10/2016 |

* cited by examiner

METHOD FOR ACTUATING AT LEAST ONE MAIN HEADLAMP OF A LIGHTING UNIT OF A VEHICLE, LIGHTING UNIT, COMPUTER PROGRAM PRODUCT AND MACHINE-READABLE MEDIUM

CROSS REFERENCE

This application claims priority to PCT Application No. PCT/EP2018/072736, filed Aug. 23, 2018, which itself claims priority to German Application No. 10 2017 119759.1, filed Aug. 29, 2017, the entirety of both of which are hereby incorporated by reference.

FIELD OF THE INVENTION

The present invention relates to a procedure for actuating at least one main headlamp of a lighting unit of a vehicle, a lighting device for a vehicle for performing such procedure, and a computer program product and a machine-readable medium.

BACKGROUND

Some such procedures for actuating at least one main headlamp of a lighting unit of a vehicle, lighting units, computer program products and machine-readable media are already known from numerous embodiments of the prior art.

For instances, a headlamp device for a vehicle is known from DE 10 2015 115 954 A1 in which a direct field of view that the driver of the vehicle is expected to keep his eyes on within an area ahead of the vehicle is estimated by means of an estimation device and a lighting area of the headlamp device is specified by means of a light distribution control and variable light distribution mechanisms in such a way that the headlamp device illuminates an area of the lighting corresponding to the direct field of view with a higher intensity than the periphery of the area of lighting.

SUMMARY OF THE INVENTION

This is where the present invention comes in.

The present invention is based on the task of improving the visual perceptibility to a vehicle driver of an area ahead of the vehicle.

One significant advantage of the invention is in particular the fact that not merely the core is adjustable/is adjusted by means of the light control depending on the input signal of the light control from the detection device for detecting a vehicle status and/or an area ahead of the vehicle in the direction of travel in terms of dimension and/or position but also that the outer area is adjustable/is adjusted by means of the light control depending on the input signal of the light from the detection device for detecting a vehicle status and/or an area ahead of the vehicle in the direction of travel in terms of dimension and/or position. Correspondingly, an improved adjustment of the lighting of the area ahead of the vehicle to the current vehicle status and/or the current area ahead of the vehicle is facilitated not only for a relatively narrow area, for instance the road with the vehicle's lane of the road and the lane of the road for oncoming traffic but also for the peripheral surroundings.

One particularly advantageous refinement of the inventive procedure provides that the outer area be adjusted independently of the setting of the core area. The flexibility of the lighting of the area ahead of the vehicle, in particular the outer area, is further improved in this way.

In principle, the first light intensity of the outer area and the second light intensity of the core area can be chosen freely within wide suitable limits.

A further advantageous refinement of the inventive procedure provides that the first light intensity be lower than a light intensity of a high beam, in particular 40% to 50% of the light intensity of a high beam. This firstly achieves a sufficient lighting of the peripheral surroundings. Secondly, it ensures that no unwanted dazzling of the vehicle driver occurs, caused for example by light-reflecting road sign or the like or other road users in the area ahead of the vehicle, for instance pedestrians, moving in the peripheral surroundings.

Another advantageous refinement of the procedure in accordance with the invention provides that the second light intensity is designed to be the same or greater than the light intensity of a high beam. Sufficient lighting of the core area of the area ahead of the vehicle that is especially important for the vehicle driver is ensured in this way. In contrast to conventional vehicle lighting systems, the core area according to the inventive procedure can be maintained at this high light intensity in a very large number of vehicle statuses and/or situation in the area ahead of the vehicle. Correspondingly, it is not necessary to reduce the light intensity in this area of great importance for road safety at the usual frequency for the purpose reducing the level of glare experienced by the vehicle driver or other road users.

A further advantageous refinement of the inventive procedure provides that the first light intensity and/or the second light intensity be adjusted depending on the input signal of the light control. This further improves the flexibility of the inventive procedure, specifically its adaptability to vehicle statuses differing from each other and/or situations in the area ahead of the vehicle.

One particularly advantageous refinement of the inventive procedure provides that the input signal of the light control be generated depending on a vehicle status in the form of the vehicle velocity of the vehicle.

For example, one advantageous refinement of the aforementioned embodiment provides that the dimensions of the core area be reduced at a higher vehicle velocity in comparison to a lower vehicle velocity. Firstly, it is possible to achieve in this way even better control over the vehicle by the vehicle driver at higher speeds. This is especially important as the response time for the vehicle driver is correspondingly shorter at higher vehicle velocities. Secondly, this effectively prevents unwanted dazzling of the vehicle driver as well as other road users even at high vehicle velocities.

In principle, the core area can be chosen freely within wide suitable limits in terms of design, dimensions, relative alignment to the outer area and shape.

One advantageous refinement of the inventive procedure according to the aforementioned embodiment, however, provides that the dimensions of the core area feature a height and a width and that the width of the core area be reduced at a higher vehicle velocity in comparison to a lower vehicle velocity. This makes it possible to achieve a relatively extensive lighting adjusted to the respective current vehicle velocity at the higher light intensity in comparison to the outer area without illuminating the peripheral surroundings with such high light intensity in an unwanted manner.

One advantageous refinement of the procedure in accordance with the latter embodiment, however, provides that the height of the core area be increased at a higher vehicle velocity in comparison to a lower vehicle velocity. In this way, the core area is enlarged as vehicle velocity increases in the dimension that is especially important for rapid travel without increasing the danger of unwanted dazzling of the vehicle driver and other road users. This is an advantage in particular at very high vehicle velocities.

A second advantageous refinement of the inventive procedure with direct or indirect reference back to claim 6 provides that the second light intensity be increased at a higher vehicle velocity in comparison to a lower vehicle velocity. This further improves the vehicle driver's control of the vehicle through the even higher light intensity of the lighting of the core area in relation to the outer area.

One other advantageous refinement of the inventive procedure provides that the light control actuate the main headlamp in such a way that the first light intensity and the second light intensity are adapted to each other stepwise or steplessly in a transition area from the core area to the outer area. In this way, the overall impression of the lighting of the area ahead of the vehicle becomes more harmonious. The vehicle driver experiences such lighting as being more pleasant in comparison to abrupt transitions in the light intensity.

Furthermore, a further especially advantageous refinement of the inventive procedure provides that the support function be transitioned from a deactivated status to an activated status and/or vice versa, i.e. from an activated status into a deactivated status, depending on at least one of the input signals of the light control from the detection device. This facilitates energy management that is advantageous specifically in modern vehicles with a high degree of electrification, i.e. a large number of electrical consumers.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1A:
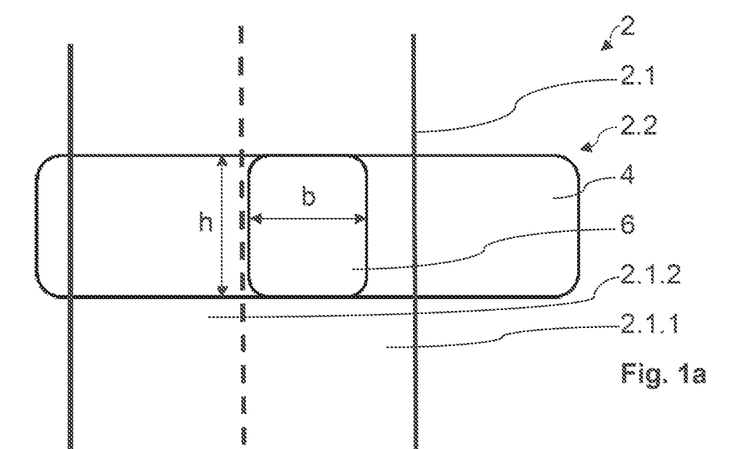
FIGS. 1*a*, 1*b*, and 1*c* illustrate a first sample embodiment of the invention.
Figure 1B:
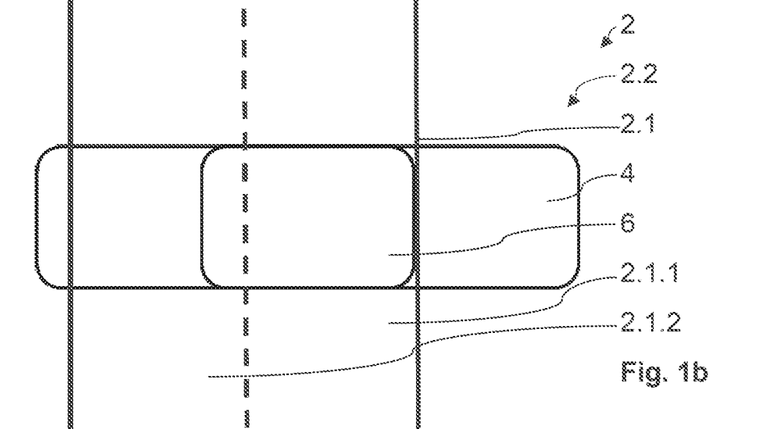
Figure 1C:
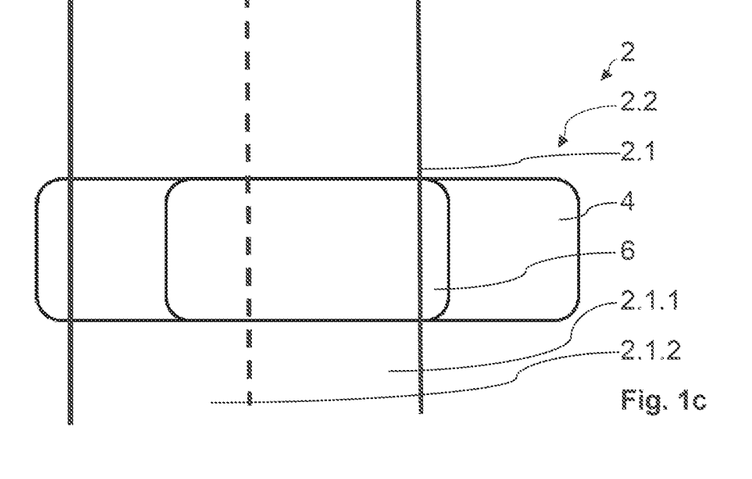

FIGS. 1*a*, 1*b* and 1*c* show a first sample embodiment of the invention. A vehicle in the form of a motor vehicle features an lighting unit with two main headlamp, a first detection device for detecting a vehicle status of the vehicle and a second detection device for detecting an area ahead of the vehicle 2 in the direction of travel as well as with a light control for automatic actuation of the two main headlamps depending on at least one input signal of the light control from the first detection device and/or the second detection device. The vehicle and the lighting unit along with the components of the lighting unit named are not shown in FIG. 1 through 4.

In an activated state of a support function of the lighting unit, the main headlamps illuminate at least one outer area 4 of the area ahead of the vehicle 2 in a first light intensity and at least one core area 6 of the area ahead of the vehicle 2 at least partially enclosed by the outer area 4 with a higher second light intensity in relation to the first light intensity.

The core area 6 of the area ahead of the vehicle 2 is adjustable by means of the light control depending on the input signal of the light control in terms of dimension and/or position in relation to the outer area 4. The same applies to the outer area 4 which is adjustable by means of the light control in such a way in terms of dimension and position depending on the input signal of the light control that the vehicle's road 2.1 and peripheral surroundings 2.2 bordering the road 2.1 in the area ahead of the vehicle 2 can be illuminated by means of the outer area 4. The road 2.1 features a lane 2.1.1 for the vehicle and a lane 2.1.2 for oncoming traffic.

In the present sample embodiment, the outer area 4 can be adjusted in terms of its dimensions and position independently of the dimensions and positions of the core area 6, where the first light intensity of the outer area 4 corresponds to around 40% of the light intensity of a conventional high beam and the second light intensity of the core area 6 corresponds roughly to the light intensity of a conventional high beam. The first and the second light intensity are therefore not static but adjustable depending on the at least one input signal of the light control from the first detection device and/or the second detection device. For example, the input signal of the light control for adjusting the first and the second light intensity can be generated depending on a vehicle status in the form of the vehicle's velocity. At a higher vehicle velocity, the second light intensity of the core area 6 is increased in comparison to a lower vehicle velocity, while the first light intensity of the outer area 4 remains constant.

In the text below, the invention is explained in more detail according to the first sample embodiment on the basis of FIG. 1*a* through 1*c*.

In FIG. 1*a* through 1*c*, the area ahead of the vehicle 2 is presented from the perspective of the vehicle driver, where FIG. 1*a* shows the lighting of the area ahead of the vehicle 2 traveling at a high vehicle velocity. FIGS. 1*b* and 1*c* show the lighting of the area ahead of the vehicle 2 traveling at a reduced vehicle velocity in comparison to the previous figure. As can be clearly seen from FIG. 1*a* in comparison to FIGS. 1*b* and 1*c*, the outer area 4 remains constant in its dimensions in the case of a reduction in the vehicle's velocity; the first light intensity of the outer area 4 also remains constant during this process at roughly 40% of the light intensity of a conventional high beam. In contrast to this, the core area 6 changes in terms of dimensions and its second light intensity.

Here, the core area 6 features a width b and a height h, which is represented in FIG. 1, as an example, by a double arrow b and a double arrow h. While the motor vehicle travels at high vehicle velocity on the lane 2.1.1 of the road 2.1, the core area 6 is formed to be less wide in comparison to FIGS. 1*b* and 1*c* and features a higher second light intensity than in the vehicle statuses corresponding to FIGS. 1*b* and 1*c*, namely a reduced velocity of the vehicle in relation to the vehicle velocity corresponding to FIG. 1*a*.

The vehicle drive decelerates the motor vehicle and the light control of the motor vehicle actuates the main headlamps depending on the changed vehicle velocity of the motor vehicle in such a way that the core area 6 is formed to be wider than in FIG. 1*a* in relation to the outer area 4. See FIG. 1*b*. While the vehicle driver continues to decelerate the motor vehicle, the main headlamps of the motor vehicle are actuated in such a way that the core area 6 continues to widen in relation to the core area 4; see FIG. 1*c*. In this respect, FIG. 1a through 1c show merely as examples three snapshots over the course of the deceleration of the motor vehicle as explained.

Actuation of the main headlamps for the generation of the light distribution that can be seen in FIG. 1a through 1c takes place continuously, i.e. essentially steplessly. For this purpose, see also FIG. 4a in which the change in the width b of the core area 6 is depicted depending on the vehicle velocity v. The width b of the core area 6 increases as the vehicle velocity decreases. Furthermore, reference is made to FIG. 4c in which the change in the second light intensity of the core area 6 is depicted depending on the vehicle velocity v. The second light intensity I of the core area 6 decreases with decreasing vehicle velocity. Accordingly, one dot on the curve on the far right in the diagram would correspond to the second light intensity I of the core area 6 in the vehicle status according to FIG. 1a and one dot on the curve on the far left in the diagram would correspond to the second light intensity I of the core area 6 in the vehicle status according to FIG. 1c.

The height h and the position of the core area 6 remain unchanged during deceleration of the motor vehicle. For this see likewise FIG. 1a through 1c. As can likewise be seen from FIG. 1a through 1c, the core area 6 is to the greatest possible extent enclosed by the outer area 4. Only at the top and bottom in the image plane of FIG. 1a through 1c does the core area 6 form a border, together with the outer area 4, to the area ahead of the vehicle 2 not illuminated by means of the main headlamps.

Two further sample embodiments of the invention are explained in more detail below on the basis of FIG. 2 through 4. In this context, the explanations are limited to the differences to the previous sample embodiment/sample embodiments. Identical and functionally identical objects have the same reference signs.

Figure 2A:
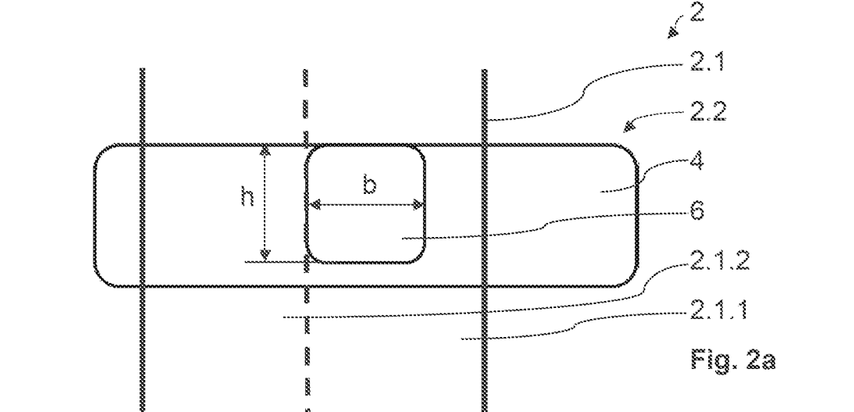
FIGS. 2*a*, 2*b*, and 2*c* illustrate a second sample embodiment of the invention.
Figure 2B:
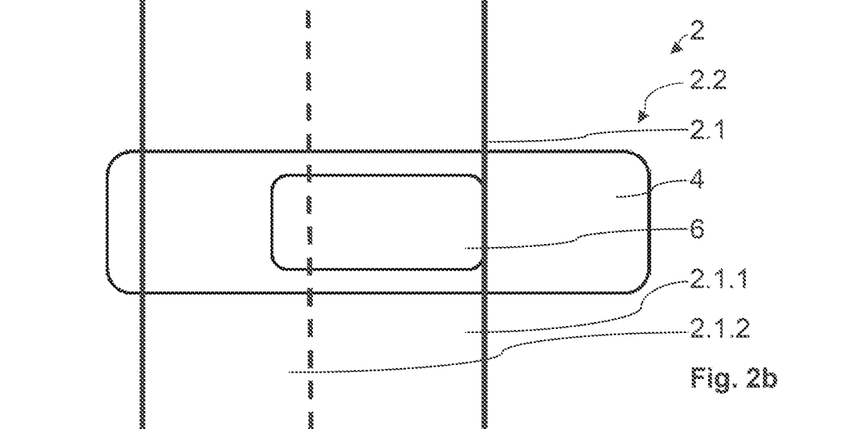
Figure 2C:
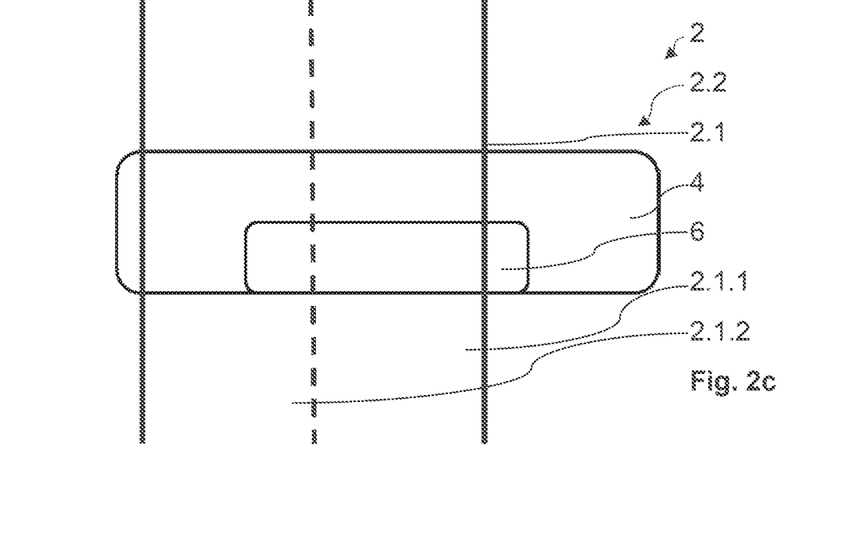

FIG. 2a through 2c show a second sample embodiment of the invention.

In line with the first sample embodiment, FIG. 2a through 2c show a driving situation in which the vehicle driver decelerates the motor vehicle. In contrast to the first sample embodiment, not only the width b of the core area 6 in relation to the outer area 4 is changed by means of the light control of the motor vehicle but also the height h and the position of the core area 6 in relation to the outer area 4. In this context, FIG. 2a corresponds to a vehicle status of a high velocity in line with the vehicle status according to FIG. 1a. While the core area 6 of the second sample embodiment at the high vehicle velocity corresponding to FIG. 2a corresponds to the core area 6 of the first sample embodiment in terms of width b and horizontal position, the height h and the vertical position of the core area 6 differ from that of the first sample embodiment in comparison to FIG. 1a. In this respect, the vertical position of the core area 6 to the vertical position of the centroid of the area of the core area 6 shown in the image plane of FIG. 2a through 2c along the double arrow h. The horizontal position of the centroid of the core area 6 corresponds to the horizontal position of the core area 6 along the double arrow b.

The core area 6 is positioned in relation to the outer area 4 according to FIG. 2a in the direction of the far range of the motor vehicle, i.e. in a direction away from the motor vehicle. In line with the first sample embodiment, the vehicle driver decelerates the motor vehicle. The light control actuates the two main headlamps in such a way that the core area 6 becomes wider and lower in relation to the outer area 4. The vertical position of the core area 6 also changes in relation to the outer area 4, from the original alignment in the direction of the far range of the motor vehicle in the direction of the close range of the motor vehicle, i.e. in the direction towards the motor vehicle. For this, see FIGS. 2b and 2c in comparison to FIG. 2a. As can also be seen from FIG. 2a through 2c, the horizontal position of the core area 6 remains constant.

Actuation of the main headlamps by means of the light control for the generation of the light distribution that can be seen in FIG. 2a through 2c takes place once again continuously, i.e. essentially steplessly. For this, see in turn FIG. 4a and FIG. 4c. The width b of the core area 6 increases as the vehicle velocity v decreases; FIG. 4a. The second light intensity I of the core area 6 decreases with decreasing vehicle velocity v; FIG. 4c. Accordingly, one dot on the curve on the far right in the diagram would correspond to the second light intensity I of the core area 6 in the vehicle status according to FIG. 2a and one dot on the curve on the far left in the diagram would correspond to the second light intensity I of the core area 6 in the vehicle status according to FIG. 2c.

Figure 4A:
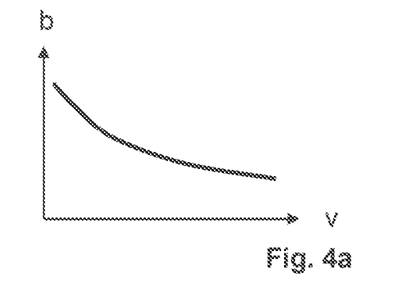
FIGS. 4*a*, 4*b*, and 4*c* illustrate diagrams depending on the vehicle velocity.
Figure 4B:
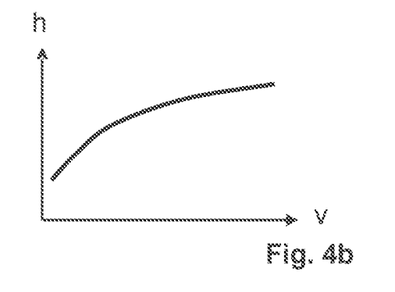

Furthermore, reference is made to FIG. 4b in which the change in the height of the core area 6 is depicted depending on the vehicle velocity. In line with the second light intensity I of the core area 6, the height h of the core area 6 decreases with decreasing vehicle velocity v. Accordingly, one dot on the curve on the far right in the diagram would correspond to the height h of the core area 6 in the vehicle status according to FIG. 2a and one dot on the curve on the far left in the diagram would correspond to the height h of the core area 6 in the vehicle status according to FIG. 2c.

Figure 3A:
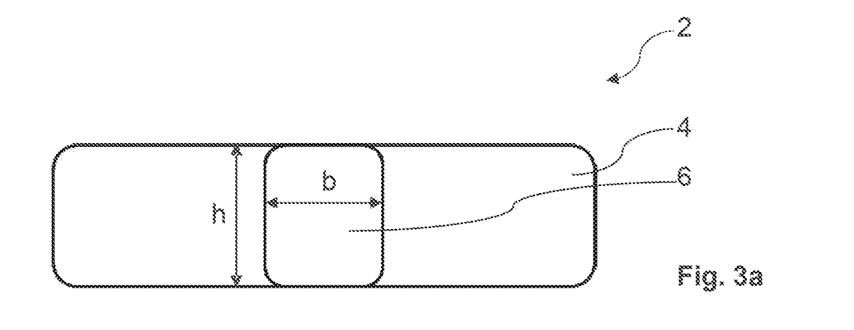
FIGS. 3*a*, 3*b*, and 3*c* illustrate a third second sample embodiment of the invention.
Figure 3B:
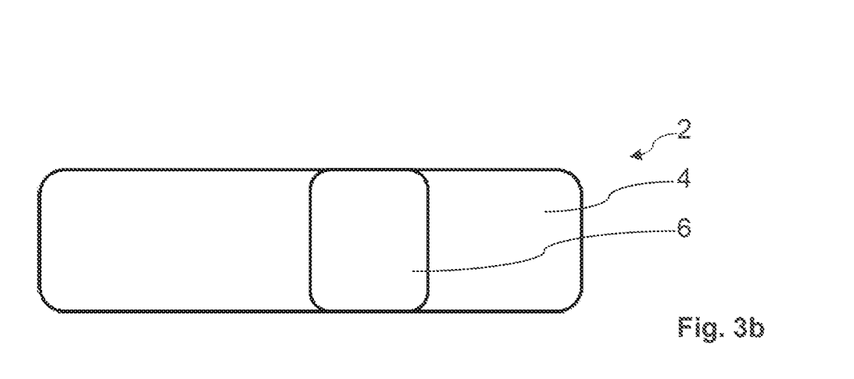
Figure 3C:
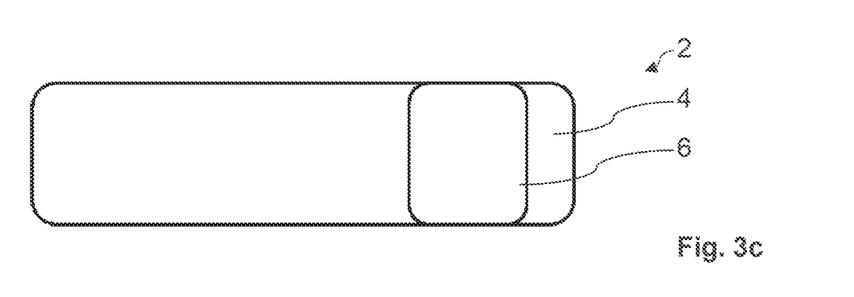
Figure 4C:
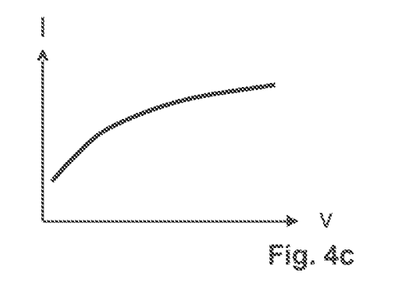

FIG. 3a through 3c show a third sample embodiment of the invention. In contrast to the two aforementioned sample embodiments, the motor vehicle is not decelerated by the vehicle driver but is driven into a bend. Unlike with the first and second sample embodiment, the width b of the core area 6 does not change in relation to the outer area 4 over the course of the bend. The height h of the core area 6 and the vertical position of the core area 6 also remain constant in relation to the outer area 4. Instead, in the third sample embodiment the horizontal position of the core area 6 in relation to the outer area 4 changes. Prior to entering a bend, the illumination of the area ahead of the vehicle identical to the illumination of the first sample embodiment according to FIG. 1a; see FIG. 3a. When driving through a bend, the horizontal position of the core area 6 unchanged in its dimensions b, h is shifted to the right along the double arrow b in the image plane of FIG. 3a through 3c in order to better illuminate the bend in this way.

Furthermore, computer program products are included, comprising commands that cause the lighting unit to execute the procedure steps of the procedure in accordance with one of the sample embodiments. The same applies to machine-readable media on which computer program products of this kind are stored.

The invention is not restricted to the present sample embodiments. For example, other vehicle statuses and areas ahead of the vehicle known to a specialist are conceivable in which the invention can be advantageously deployed.

In addition, it is possible for the light control to actuate the main headlamp in such a way that the first light intensity and the second light intensity are adapted to each other stepwise or steplessly in a transition area from the core area to the outer area.

Furthermore, it can be provided that the support function is transitioned from a deactivated status to an activated status and/or from an activated status into a deactivated status depending on at least one of the input signals of the light control from the at least one detection device.

The at least one detection device can take many suitable forms known to the specialist. For example, a front camera, a radar system, LiDAR, navigation system or steering-angle sensor. Combinations of known technologies are conceivable and, depending on the application in question, expedient.

The parameters captured by means of the at least one detection device can also be chosen freely within wide suitable limits. For example, it is possible to detect the type of road the vehicle is traveling along in order to incorporate the vehicle driver's viewing behavior, which depends on the route in question, into the light control. Whatever the difference in the viewing behavior on the part of vehicle driver when driving along a city street, a country road or on the highway, the light control can then also adjust the outer area and the core area depending on the route in question. For example, it is also possible to estimate an anticipated range of vision of the vehicle driver depending on the vehicle's velocity and to incorporate the same into the aforementioned light control. Factors such as the route characteristics, i.e. whether the vehicle's road is winding or runs in a straight line, whether the vehicle driver's field of view is free or blocked, whether the section of the road ahead it potentially dangerous, or the like, can be incorporated into the light control. The same applies to the driving behavior of the driver of the vehicle. Depending which of the potential drivers of the vehicle is identified by means of a suitable vehicle status detection system, the preferences and needs of the current vehicle driver can be taken into consideration in the light control.

In terms of dimensions and/or position and/or first light intensity, the outer area is adjustable at will within wide suitable limits. It is, for example, conceivable for the outer area to be adjustable in terms of dimensions and/or position and/or first light intensity depending in part on the adjustment of the dimensions and/or the position and/or the second light intensity of the core area. "In part" means that merely one part of the group corresponding to the outer area consisting of dimensions, position and first light intensity is formed depending on the group of dimensions, position and second light intensity adjusted by the light control and corresponding to the core area. In this respect, it is also conceivable that, for instance, the width and the height of the outer area and/or the vertical and horizontal position of the outer area are each treated differently from each other.

LIST OF REFERENCE SYMBOLS

2 Area ahead of the vehicle
2.1 Vehicle's road in area ahead of the vehicle 2
2.1.1 Vehicle's traffic lane of the road 2.1
2.1.2 Oncoming traffic lane of the road 2.1
2.2 Peripheral surroundings of the area ahead of the vehicle 2
4 Outer area
6 Core area

The invention claimed is:

1. A method for actuating at least one main headlamp of a lighting unit of a vehicle, the vehicle including at least one detection device for detecting at least one of a vehicle status and an area ahead of the vehicle in the direction of travel, the vehicle also including a light control for the automatic actuation of the main headlamp depending on at least one input signal of the light control from the detection device, the method comprising the steps of:

illuminating, by the main headlamp in an activated state of a support function, at least one outer area of the area ahead of the vehicle in a first light intensity, illuminating, by the main headlamp in an activated state of a support function, at least one core area of the area ahead of the vehicle at least partially enclosed by the outer area with a higher second light intensity in relation to the first light intensity;

adjusting the core area by the light control relative to the outer area depending on the input signal of the light control in terms of dimension and/or position, wherein the outer area is adjusted by means of the light control in such a way depending on the input signal of the light control in terms of dimension and/or position of a road ahead of the vehicle, and wherein peripheral surroundings bordering the road in the area ahead of the vehicle are illuminated by means of the outer area.

2. The method of claim 1, wherein the outer area is adjusted independently of the setting of the core area.

3. The method of claim 1, wherein the first light intensity is lower than a light intensity of a high beam.

4. The method of claim 1, wherein the second light intensity is the same or greater than the light intensity of a high beam.

5. The method of claim 1, wherein at least one of the first light intensity and the second light intensity are adjusted depending on the input signal of the light control.

6. The method of claim 1, wherein the input signal of the light control is generated depending on a vehicle status in the form of the vehicle velocity of the vehicle.

7. The method of claim 6, wherein the dimensions of the core area are reduced at a higher vehicle velocity in comparison to a lower vehicle velocity.

8. The method of claim 7, wherein the dimensions of the core area feature a height and a width and that the width of the core area is reduced at a higher vehicle velocity in comparison to a lower vehicle velocity.

9. The method of claim 8, wherein the height of the core area is increased at a higher vehicle velocity in comparison to a lower vehicle velocity.

10. The method of claim 6, wherein the second light intensity is increased at a higher vehicle velocity in comparison to a lower vehicle velocity.

11. The method of claim 1, wherein the light control actuates the main headlamp such a way that the first light intensity and the second light intensity are adapted to each other stepwise or steplessly in a transition area from the core area to the outer area.

12. The method of claim 1, wherein the support function is transitioned from a deactivated status to an activated status and/or vice versa depending on at least one of the input signals of the light control from the detection device.

13. A lighting device for a vehicle for performing the procedure in accordance with claim 1, the lighting device comprising:

at least one main headlamp with at least one detection device for detecting at least one of a vehicle status and an area ahead of the vehicle in the direction of travel;

a light control for the automatic actuation of the main headlamp based on at least one input signal of the light control from the detection device, where an outer area of the area ahead of the vehicle in a first light intensity and at least one core area of the area ahead of the vehicle at least partially enclosed by the outer area with a higher second light intensity in relation to the first light intensity are illuminated by the main headlamp in an activated state of a support function and where the core area is adjustable relative to the outer area by the light control depending on the input signal of the light control in terms of dimension and/or position, wherein the outer area is adjusted by means of the light control in such a way depending on the input signal of the light control in terms of dimension and/or position of a road ahead of the vehicle and peripheral surroundings bordering the road in the area ahead of the vehicle can be illuminated by means of the outer area.

14. A computer program product embodied on a computer readable recording medium, which when executed performs the method of claim 1.

\* \* \* \* \*